United States Patent
Boone

[11] Patent Number: 5,106,121
[45] Date of Patent: Apr. 21, 1992

[54] OCCUPANT RESTRAINT BELT ANCHORAGE ARRANGEMENT

[75] Inventor: Marion C. Boone, Oak Park, Mich.

[73] Assignee: Chrysler Corporation, Highland Park, Mich.

[21] Appl. No.: 688,398

[22] Filed: Apr. 22, 1991

[51] Int. Cl.[5] .............................................. B60R 22/34
[52] U.S. Cl. ..................... 280/807; 280/808; 297/469
[58] Field of Search ...... 280/801, 802, 803, 807, 808; 297/468, 483, 469, 481, 485; 296/68.1

[56] References Cited

U.S. PATENT DOCUMENTS 3,794,135  2/1974  Ewert et al. .................. 280/802
4,400,013  8/1983  Imai ............................ 280/801

FOREIGN PATENT DOCUMENTS 2314511  9/1973  Fed. Rep. of Germany ...... 280/802
0221950  9/1987  Japan ............................ 280/802

Primary Examiner—H. Grant Skaggs
Assistant Examiner—Carol Lynn Druzbick
Attorney, Agent, or Firm—Edward P. Barthel

[57] ABSTRACT

An occupant restraint belt system for a motor vehicle of the type having front driver and passenger side doors and a single rear side door on the passenger side of the vehicle. A two-passenger bench seat structures and a three-passenger seat structure are adapted to be removably coupled to the vehicle floor pan. The invention enables a single occupant restraint belt system to be selectively used by an outboard occupant of either one of the seat structures. The occupant restraint seat belt system has its one free end provided with a snap-action hook adapted for selective engagement with either a floor pan anchorage or a vehicle wall anchorage depending upon which seat structure is being used in the vehicle.

3 Claims, 5 Drawing Sheets

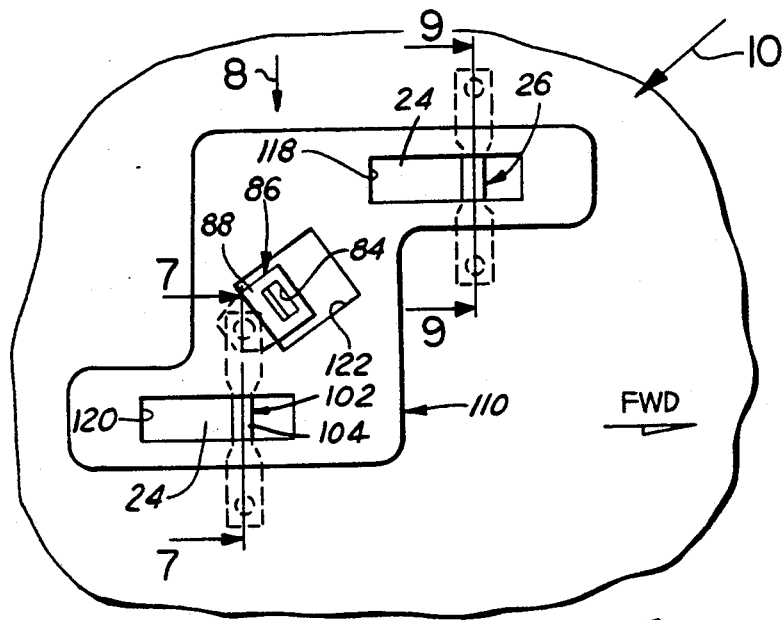
FIG.6
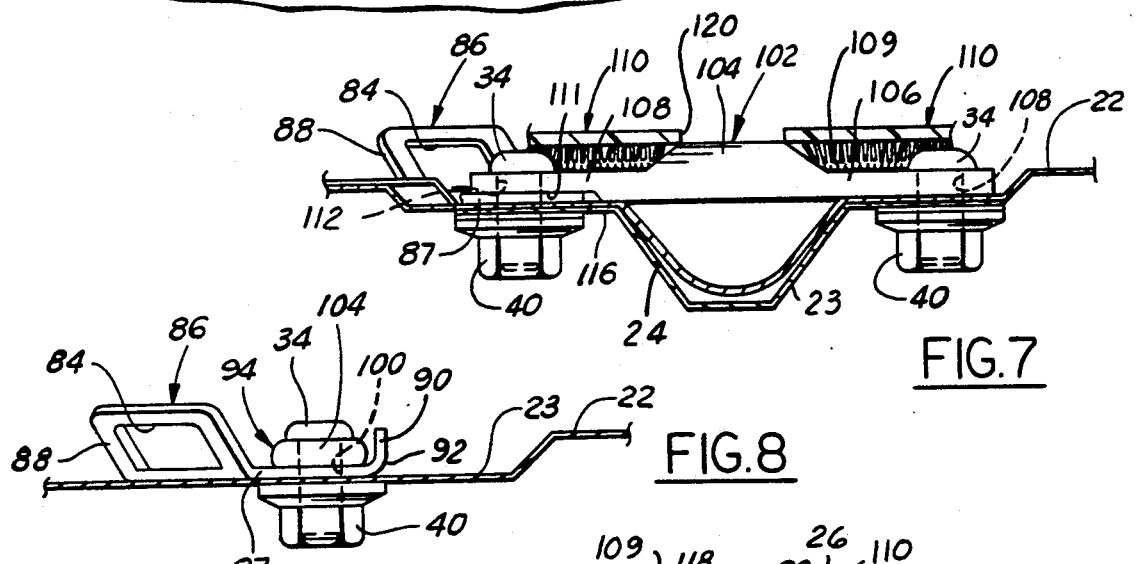
FIG.7
FIG.8
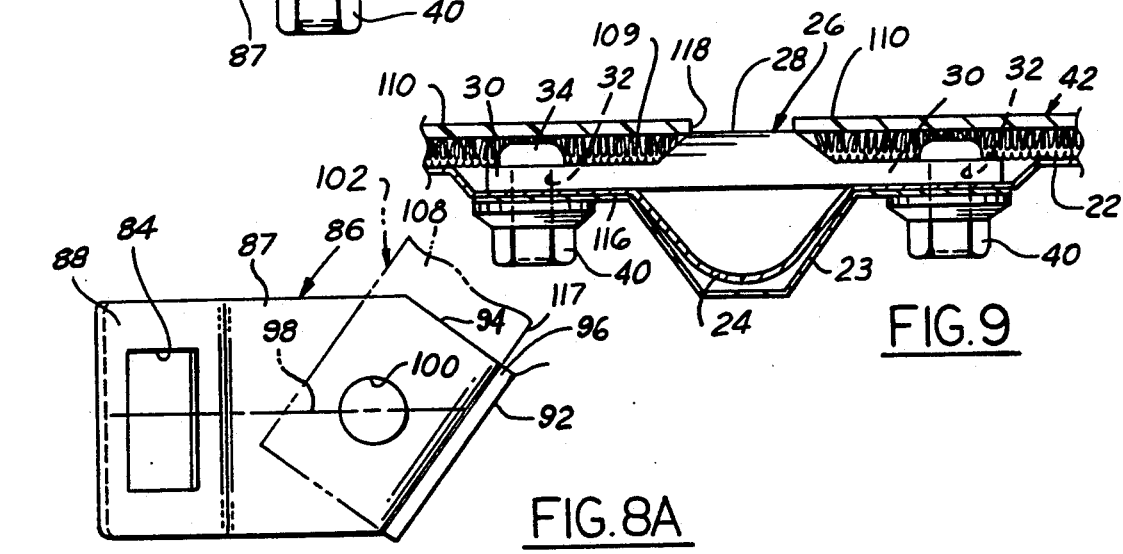
FIG.9
FIG.8A

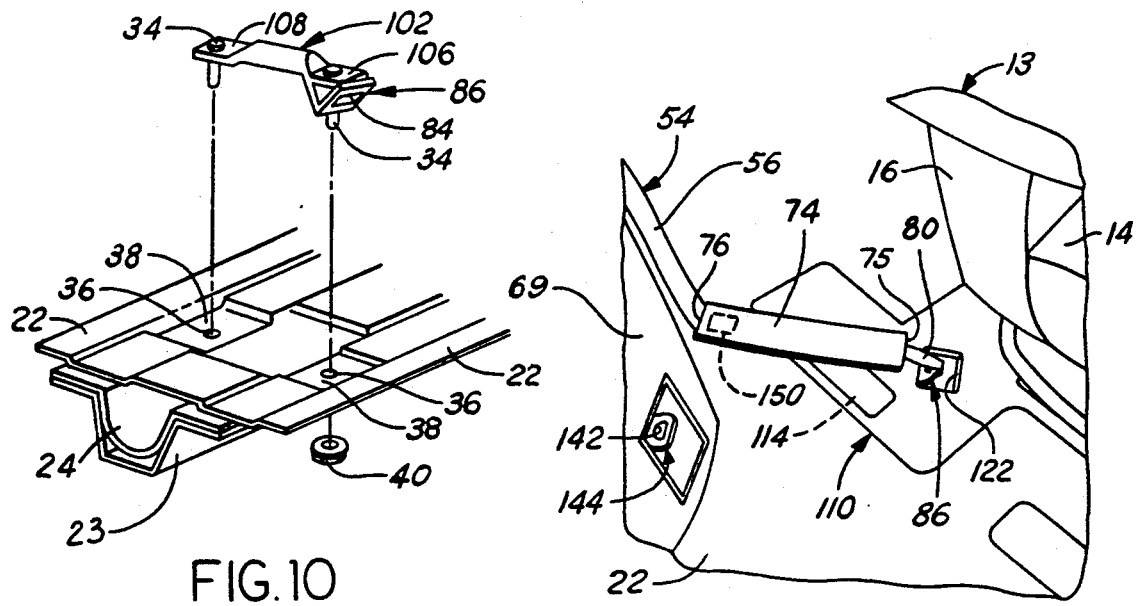
FIG. 10
FIG. 11
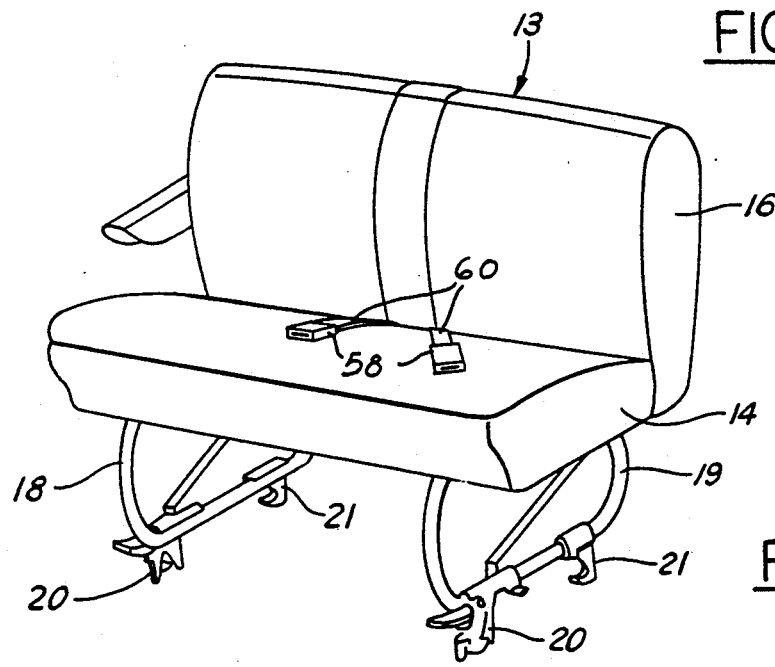
FIG. 12
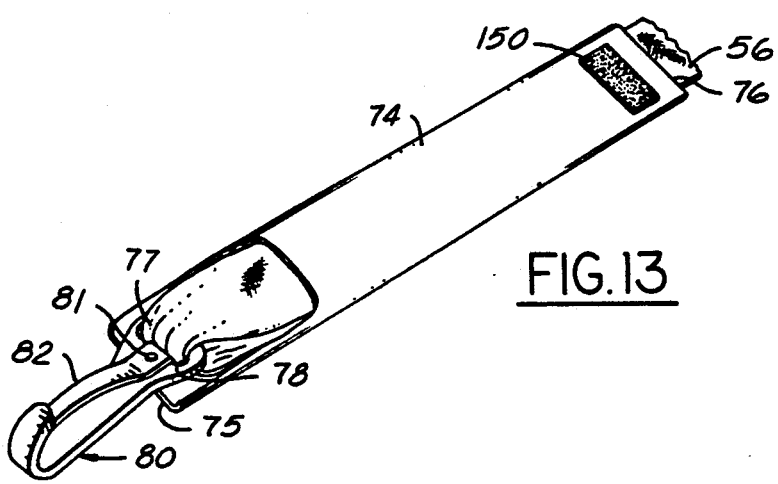
FIG. 13

OCCUPANT RESTRAINT BELT ANCHORAGE ARRANGEMENT

BACKGROUND OF THE INVENTION

This invention relates to restraint belt systems for automotive vehicles and more particularly to a single occupant restraint seat belt system adapted for a vehicle employing alternative removable seat structures.

Certain conventional van-type automotive vehicles provide an optional passenger seating arrangement wherein either a two passenger removable rear bench seat or a three passenger removable rear bench seat are employed behind the driver and right hand passenger front seats. The first seating arrangement accommodates a two-passenger bench seat structure having one outboard occupant seat spaced from the vehicle body single rear side door opening providing a passenger easy access to the vehicle area rearwardly of the two-passenger bench seat structure. A second seating arrangement accommodates a three-passenger bench seat structure having one outboard occupant seat juxtaposed the vehicle body single rear side door opening obviating a passenger access to the vehicle area rearwardly of the three-passenger seat structure. With the advent of shoulder belt restraints for rear seat occupants a restraint belt system was required that would readily accommodate both the two-passenger and three-passenger bench seat arrangements.

SUMMARY OF THE INVENTION

It is a feature of the present invention to provide an automotive vehicle occupant restraint belt system adapted to readily accommodate a plurality of removable seat structure arrangements in a vehicle.

It is another feature of the present invention to provide an automotive vehicle occupant restraint belt system adapted to accommodate a first removable seat structure having one occupant seat spaced from the vehicle body side wall permitting a passenger easy access to the vehicle area rearwardly of the first seat structure from a side door opening or a second removable seat structure replacing the first seat structure such that one occupant outboard seat of the second seat structure is juxtaposed the vehicle body side wall.

It is still another feature of the present invention to provide an automotive vehicle occupant restraint belt system as set forth above wherein a seat belt floor anchorage is uniquely incorporated with a seat structure floor mounting socket to accommodate the occupant restraint belt system for a two-passenger bench seat structure providing a passenger easy access to the vehicle area rearwardly thereof.

In accordance with the invention an outboard occupant seat restraint belt system is provided with a vehicle wall anchorage point fixed on the vehicle side wall adjacent the vehicle rear side door opening and the floor pan for use with an outboard occupant seat of the three-passenger seat structure. Further, a floor pan anchorage point, incorporated with one of the floor pan mounting sockets, is uniquely provided for use when a removable two-passenger seat structure is installed in the vehicle in place of the removable three-passenger seat structure. The floor pan anchorage point enables the outboard occupant seat belt restraint system to be adapted for use with an outboard occupant seat of the two-passenger seat structure. The floor pan anchorage is incorporated with one of the floor pan mounting sockets for receiving a leg latch hook of the three-passenger seat structure. The occupant restraint seat belt system has its one free end provided with a snap-action hook adapted for selective engagement with either the floor pan anchorage or the vehicle wall anchorage depending whether the two-passenger or three-passenger seat structure, respectively, is being used in the vehicle.

The invention provides a rigid plastic cover or scabbard fixed on the occupant restraint seat belt system one free end above the snap-action hook providing a stowed mode for use with the two-passenger bench seat structure. The scabbard has a predetermined length and is provided with a Velcro patch adjacent its other end adapted to be releasably fixed to the vehicle floor carpet. With the scabbard snap action hook engaged with the floor pan anchor point the scabbard is readily pivoted thereabout enabling the Velcro patch to be pressed into engagement with the carpet adjacent the vehicle side wall. This arrangement maintains the belt restraint segment in close proximity to the vehicle side wall when not in use providing easy passenger access to the rearmost seat structure.

BRIEF DESCRIPTION OF THE DRAWINGS

These and other objects, features and advantages of the invention will appear from the following written description and the accompanying drawings in which:

FIG. 6 is an enlarged fragmentary top elevational view taken substantially along the line 6—6 of FIG. 5;

FIG. 7 is an enlarged fragmentary sectional view, partly in elevation, taken along the line 7—7 of FIG. 6;

FIG. 8 is an enlarged fragmentary longitudinal sectional view taken in the direction of arrow "FIG. 8" as viewed in FIG. 6;

FIG. 8A. is an enlarged top elevational detail view of the floor anchor;

FIG. 9 is an enlarged fragmentary sectional view, partly in elevation, taken along the line 9—9 of FIG. 6;

FIG. 10 is fragmentary exploded perspective view taken in the direction of arrow "FIG. 10" in FIG. 6 showing the installation of a seat mounting striker assembly;

FIG. 11 is a fragmentary perspective interior view of the first seating and occupant restraint arrangement, taken in the direction of arrow "FIG. 11", in its stored position;

FIG. 12 is a fragmentary exploded perspective view of a removable two passenger bench seat and vehicle floor pan mounting sockets for the first seating arrangement of the invention; and FIG. 13 is a fragmentary enlarged perspective view of the scabbard and snap-action hook end of the restraint belt with a portion of the scabbard broken away.

DETAILED DESCRIPTION OF THE INVENTION

Figure 1:
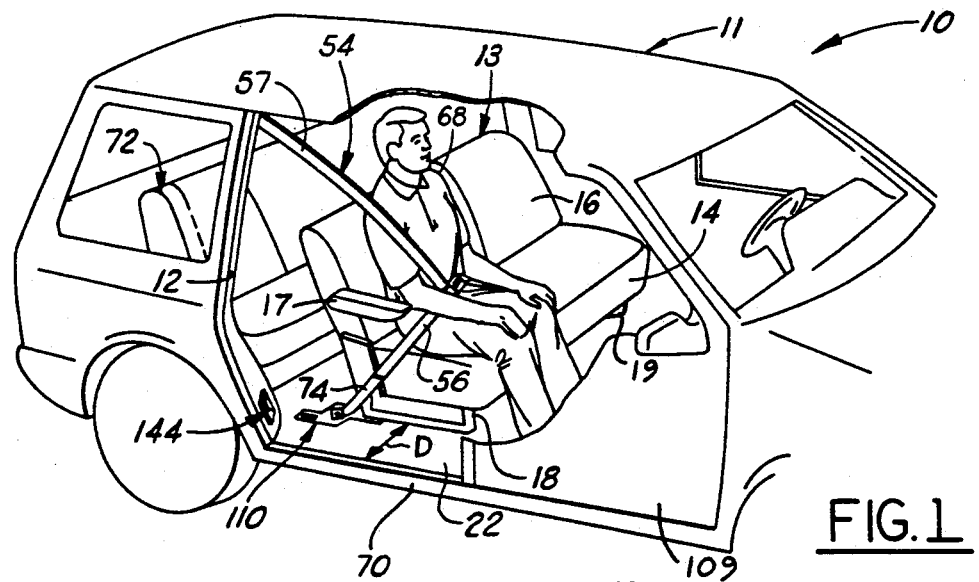
FIG. 1 is a fragmentary perspective view of an automotive vehicle, with its side door removed and parts broken away, showing a first seating and occupant restraint arrangement of the present invention in its in-use position.

Referring now to the drawings and in particular to FIG. 1 a van type passenger vehicle is partially shown at 10 having a body 11 provided with a rear seat passenger side door opening or entrance 12 adapted to be closed by a conventional sliding side door (not shown). Reference may be had to U.S. Pat. No. 4,569,553 issued Feb. 11, 1986 to Speth et al. for details of one form of vehicle sliding side door adapted for use with the vehicle 10.

The interior of vehicle body 11 has a removable two-passenger intermediate bench seat structure, generally designated by reference numeral 13, which comprises a seat cushion 14 and a seat back 16, including fold down arm rests 17, to which the outboard occupant seat restraint belt system of the present invention is applicable. The removable two-passenger bench seat 13, as best shown in FIG. 12, is supported by a pair of laterally spaced tubular U-shaped support legs 18 and 19. Each support leg 18 and 19 has forward 20 and aft 21 floor latch mechanisms fixed thereto releasably lockable to floor anchor means secured to the vehicle floor pan 22.

In the disclosed embodiment the two-passenger seat structure 13 is adapted to be removably coupled to the floor pan 22. As best seen in FIG. 10, the floor pan 22 is formed with a plurality of laterally spaced, longitudinally extending raised and depressed channels. Certain of the depressed channels are reinforced with a pair of outboard elongated trough-shaped side rails underlying the floor pan and secured as by welding thereto with one of the side rails being is shown at 23 in FIG. 10.

Figure 2:
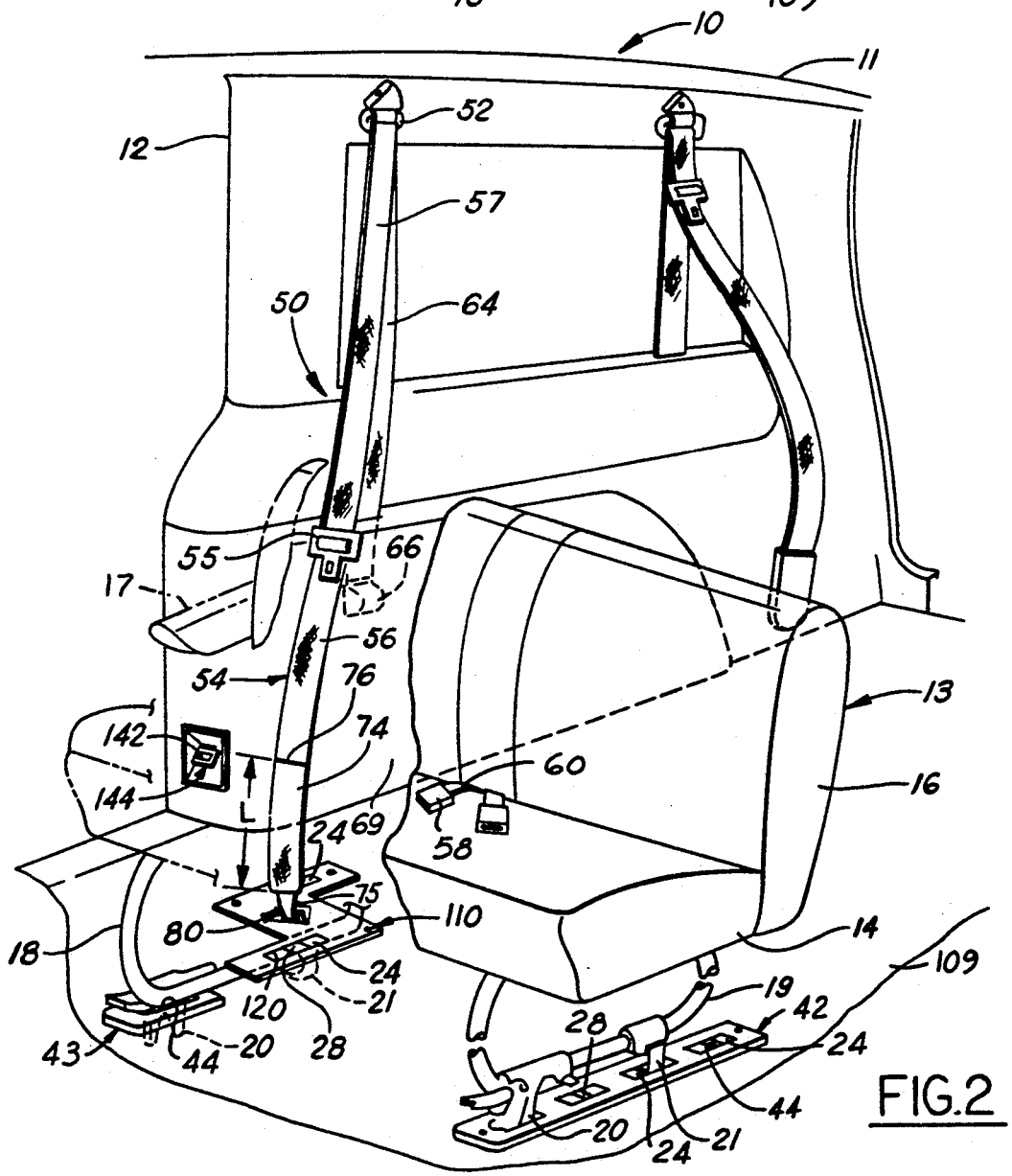
FIG. 2 is a fragmentary enlarged perspective interior view of the automotive vehicle, with parts broken away, showing the first occupant restraint arrangement in its non-use position.

FIG. 2 illustrates the floor pan 22 provided with a plurality of mounting sockets 24 each bridged by a transversely extending striker rod 26. As best seen in FIG. 9 each mounting socket 24 has a longitudinally elongated bowl-shape. Each striker rod 26 formed with a central circular sectioned bar portion 28 and a pair of mirror image flattened end tongues 30. Each end tongue 30 has a mounting hole 32 adapted to receive a bolt 34 therethrough which extends through an aligned hole 36 in each of a pair of floor pan recessed portions 38 (FIG. 10) whereby each bolt 34 is retained by a nut 40 threaded thereon. The striker rod end tongues 30 have a predetermined thickness such that when bolted down their upper faces are substantially flush with the surface of the floor pan raised channels. As seen in FIG. 2 the floor mounting sockets 24 are enclosed by suitable cover plates 42 and 43 having rectangular openings 44 providing access to each striker rod bar portion 28 by their associated forward and aft seat structure latching mechanisms 20 and 21, respectively.

Figure 5:
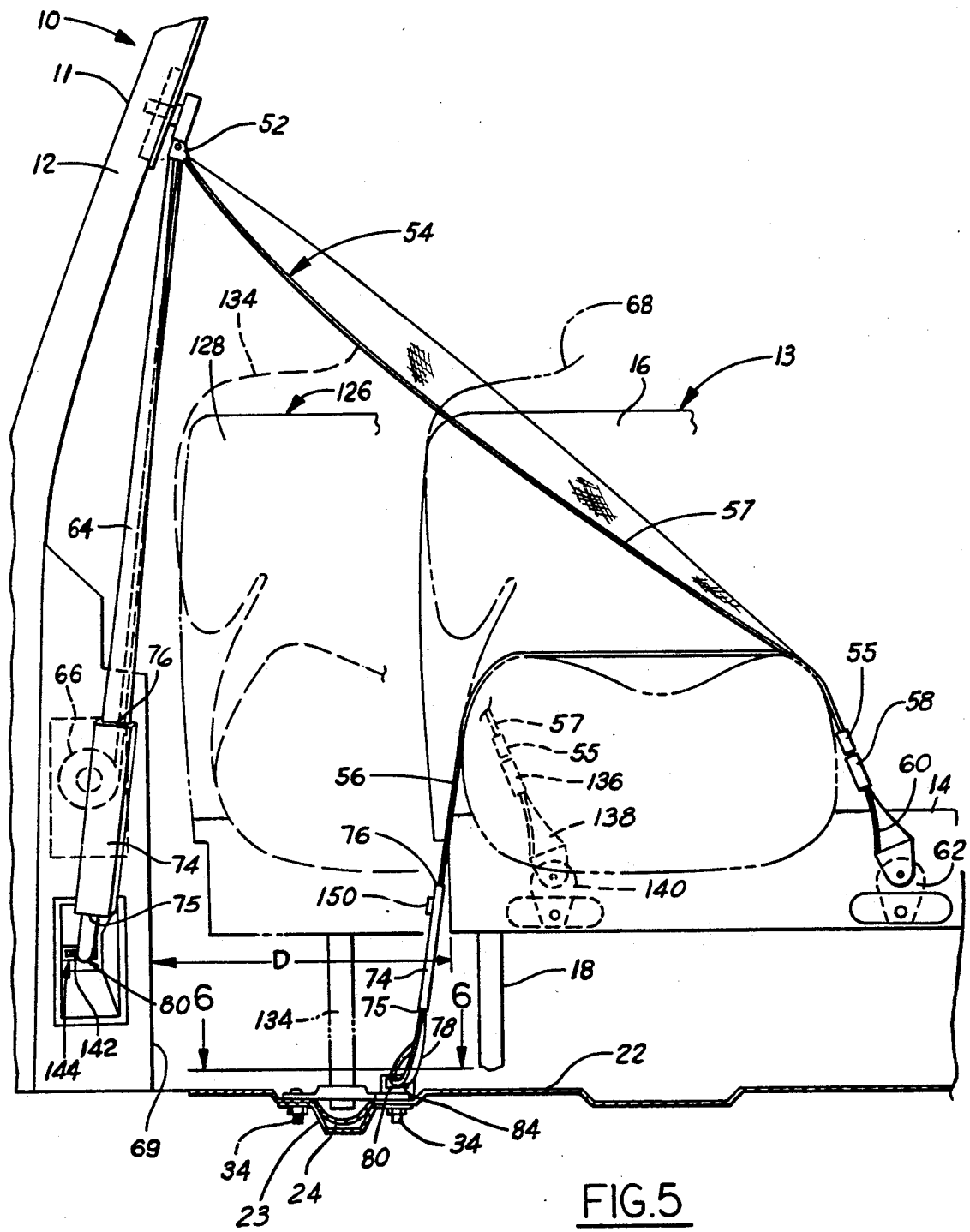
FIG. 5 is an enlarged fragmentary transverse sectional view, partly in elevation, taken through the vehicle body showing the first seating and occupant restraint arrangement in full lines and partially showing the second seating and occupant restraint arrangement in dashed lines.

With reference to FIGS. 1 and 2 the first occupant restraint arrangement for the two-passenger seat structure 12 includes an outboard occupant restraint belt system, generally indicated at 50, having a slide loop 52 mounted on the vehicle side wall adjacent the side door opening aft edge 12. The occupant restraint belt system 50 includes a restraint belt portion 54 along which a latch plate 55 is slidably disposed which divides the restraint belt portion 54 into a lap belt segment 56 and a shoulder belt segment 57 both of which extend diagonally across the outboard occupant 68 in its in-use position of FIG. 1. As seen in FIG. 5 a buckle 58 is mounted to the seat structure 13 by an anchor strap 60 pivotally connected to a seat bracket 62. FIG. 2 illustrates a retractable belt segment 64 extending vertically along the vehicle side wall, in parallel relationship with the restraint belt lap segment 56 ready position, from a retractor 66 disposed below the side loop 52 and mounted within the body side wall.

It will be seen in FIGS. 1 and 5 that the twopassenger seat structure 12 is mounted on the floor pan 22 such that the occupant 68 (FIG. 5), seated in the one outboard seat position, is spaced a predetermined lateral clearance dimension "D" from vehicle side wall portion 69 adjacent the right hand side door opening, defined in part by body side door rail portion 70 and vertical side door aft edge 12 (FIG. 1). The lateral clearance dimension "D" is required to provide a passenger, upon entering through the right hand side door opening, easy access to the vehicle area rearwardly of the seat structure 12 so as to occupy an aft or rearmost seat structure 72 (FIG. 1).

With reference to FIG. 5 it will be appreciated that the restraint belt lap segment 56 must be anchored to the vehicle floor pan at an anchor point located inboard from the vehicle side wall 69 a distance substantially equal to the dimension "D". To accomplish this applicant has provided a belt length adjacent the free end of the restraint belt lap segment 56 encased by a molded plastic stiffening cover, or tubular scabbard 74 having a predetermined length "L" between its lower open anchor end 75 and its other open belt end 76 (FIG. 2). As seen in FIG. 13, one free end 77 of the restraint belt 56 is looped through and secured to a slot 78 in attaching end plate of a snap-action hook 80. The snap-action hook 80, which projects from the scabbard open anchor end includes a cooperating leaf spring catch 82 riveted thereto at 81.

With reference to FIGS. 7 and 8, the snap-action hook 80 is adapted to engage an attachment aperture 84 of a steel floor anchor, generally indicated at 86. As seen in FIG. 8A the floor anchor plate 86 has a horizontal generally rectangular central base 87 with one end formed with a first transversely extending bent flange portion 88 inclined upwardly and outwardly therefrom at an obtuse angle from one transverse edge with the aperture 84 therein. The anchor plate base opposite end is formed with a second obliquely extending right-angled bent flange portion 90 projecting vertically upwardly therefrom one opposite slanted bent edge 92. It will be noted in FIG. 8A that the slanted bent edge 92 together with slanted free edge 94 intersect at point 96 at substantially ninety degrees. The point 96 is shown offset from the floor anchor longitudinal axis 98 which axis intersects the center of base bolt hole 100.

FIG. 7 shows a modified striker rod 102 formed with a central circular sectioned bar portion 104 having asymmetric flattened tongue ends 106 and 108. It will be noted that vehicle floor carpet 109 is interposed between the tongue ends 106 and 108 and the overlying composite cover plate 110 in the same manner as cover plate 42 overlies the striker rod 26. Also, the tongue end 106 is identical to the tongue end 30 of the striker rod 28 while the opposite tongue end 108 is formed with an undercut recess 111. The undercut recess 111 is of a predetermined dimension equal to the thickness to the floor anchor base plate portion 87. Thus, with the recess 111 receiving the plate base portion 87 and a bolt 34 extending through an tongue end hole 112 and the floor anchor aligned hole 100 tightening of the nut 40 seats the floor anchor plate base 87 flush on mounting socket 114 depressed border 116.

It will be noted in FIG. 8A that with the anchor plate second bent flange 92 inner surface abutting side edge 117 of the base hole 100 is aligned with the tongue end hole 112. Further, with the snap-action hook 80 engaging the anchor plate aperture 84 a force applied by the occupant restraint belt system will urge the second bent flange portion 90 into abutting contact with the tongue end side edge 117 obviating excess sheer forces being applied to the bolt 40.

As seen in FIG. 6 a composite cover plate member 110 is provided to enclose both an inboard mounting socket 24 and outboard rearwardly offset mounting socket 24. The composite cover plate member 110 has a rectangular outboard aperture 118 for the outboard mounting socket 24 and a rectangular inboard aperture 120 for the inboard mounting socket 24. Further, the composite cover plate member 110 has an intermediate oblique rectangular aperture 122 positioned to receive therein the angled flange 88 of the floor anchor 86 allowing ready access to the anchor slot 84 by the snap-action hook 80.

It will be seen in FIGS. 1 and 2 that with the two passenger seat structure 12 attached to the floor pan 22 only the inboard mounting socket 24 is used to receive an associated aft floor latch 21 of the seat structure 12. Accordingly, the floor anchor attachment slot 84 is correctly positioned to provide a floor anchor point for the snap-action hook portion 80 on the free end of the lap belt segment 56 as seen in FIG. 5.

Figure 3:
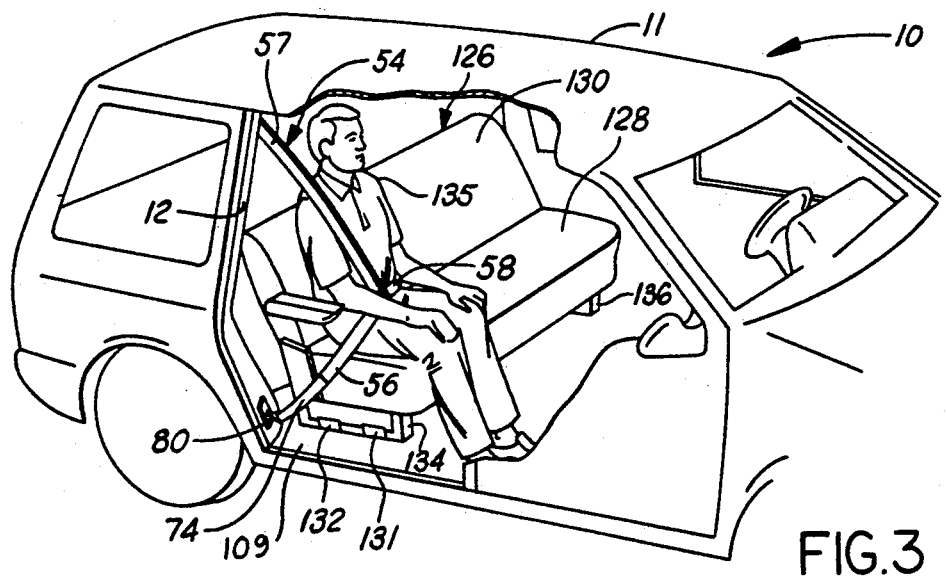
FIG. 3 is a view similar to FIG. 1 showing a second seating and occupant restraint arrangement of the invention in its in-use position.
Figure 4:
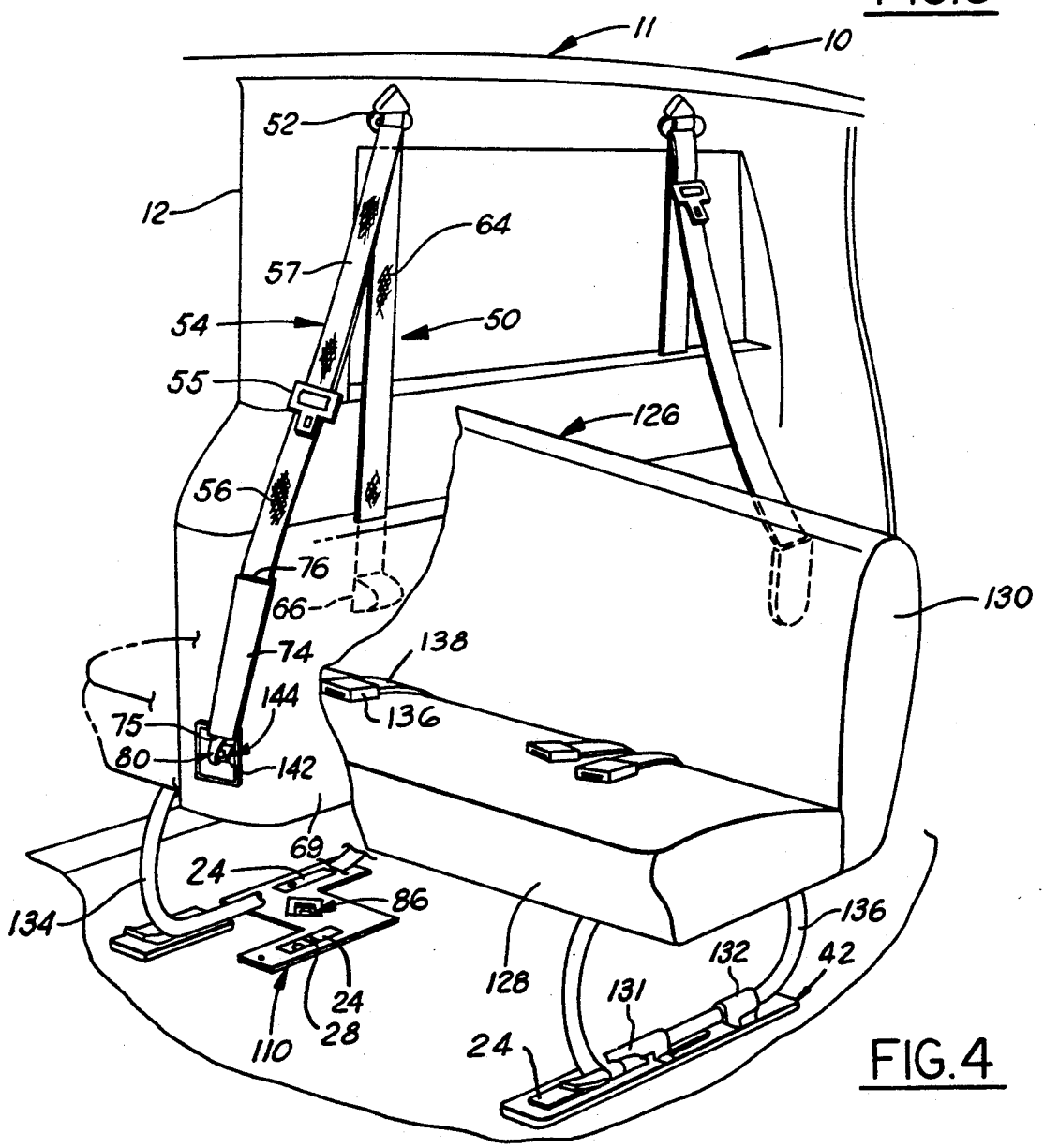
FIG. 4 is a view similar to FIG. 2 showing the second seating restraint arrangement in its non-use position.

With reference to FIGS. 3 and 4, the two-passenger bench seat structure 13 is removed from the vehicle and is shown replaced by a three-passenger removable bench seat structure 126 having a seat cushion 128 and a backrest 130. The seat structure 126 is shown with fore 131 and aft 132 floor latch mechanisms on each of its laterally spaced legs 134 and 136 secure the seat structure 126 to the vehicle floor pan 22. It will be noted that aft floor latch mechanism 132 of leg 134 is attached in an outboard socket 114 in the same manner as the seat structure 13 aft floor latch mechanism 21 is attached to the inboard socket 24.

In the three passenger bench seat structure 130 mode of FIG. 3 the belt system 50 is shown with its restraint belt portion lap belt segment 54 and the shoulder belt portion 62 extending diagonally across an occupant 135 in its in-use position. As seen in dashed lines in FIG. 5 a buckle 137 is mounted to the rear seat structure 130 by an anchor strap 138 pivotally connected to a seat bracket 140. The snap-action hook portion 80 is shown disconnected from the floor anchor 86 and connected to a slotted opening 142 of a side wall anchor 144 suitably affixed to the vehicle body. As seen in FIG. 4 the wall anchor 144 provides stowage of the restraint belt segment 56 along the vehicle side wall when not in use.

With reference to FIG. 11 a stored mode for the first restraint arrangement is shown allowing easy access to the vehicle area rearwardly of the two passenger seat structure 12. The scabbard 72, having a predetermined length "L", is provided with means on its outboard side adjacent its one end 76 (FIG. 5) for removably attaching the scabbard to the vehicle floor carpet. In the preferred embodiment a Velcro hook or male patch portion 150, stitched to the scabbard adjacent its end 76, provides the attaching means with its projecting flexible hooked fingers adapted to releasable engage looped pile of a conventional vehicle floor carpet overlying the vehicle floor pan 22.

Thus, with the snap-action hook 80 engaged to the floor anchor 86, the scabbard 72 may be pivoted downwardly about the anchor plate flange portion 88 by means of the snap-action hook locked to the anchor aperture 84. As a result the scabbard outboard Velcro patch side is placed into overlying contact with the vehicle floor at an oblique horizontal angle to the vehicle longitudinal axis with the scabbard belt end 76 located adjacent the vehicle side wall 69. The user, by merely pressing on the scabbard one belt end 76, causes the Velcro patch 150 to releasably fix the scabbard belt end 76 to the vehicle carpet adjacent the vehicle side wall. As a result, the belt segment 56 is adapted to be held in a stowed mode by being maintained in close proximity to the vehicle side wall when not in use. By virtue of the scabbard floor attaching stowed arrangement passengers have easy unobstructed access to the vehicle rearmost seat structure 72 (FIG. 1) with the scabbard 74 additionally protecting the enclosed belt length from foot traffic.

While the principles of the present invention in connection with the specific test device has been described, it is to be understood the foregoing detailed description has been made by way of example only and not as a limitation to the scope of the invention as set for in the accompanying claims.

What is claimed is:

1. In a motor vehicle occupant restraint belt system wherein a plurality of seat structures are adapted to be removably coupled to a vehicle floor pan, each said seat structure having a buckle mounted by an anchor strap thereon, each said seat structure having leg means providing fore and aft pairs of laterally spaced latch hook means carried thereon, said floor pan being formed with a plurality of pairs of laterally spaced mounting sockets, each said mounting socket having a transversely extending striker rod adapted to be engaged by an associated one of said latch hook means, a slide loop mounted on a vehicle body side for slidably mounting the belt and defining a retractable belt portion extending vertically along said side wall from a belt retractor mounted below said side loop and a restraint belt portion movable between an outboard occupant restraining position extending diagonally across the outboard occupant and a stored position extending along the side wall in parallel relationship with said retractable belt portion, said restraint portion slidably carrying a latch plate which divides said restraint portion into a shoulder belt segment and a lap belt segment, an improved anchorage arrangement enabling the belt system to be used with either a first seat structure adapted to be removably positioned on the floor pan providing an occupant outboard seat located a predetermined lateral dimension from said side wall providing a passenger easy access space to the vehicle area rearwardly of said first seat structure upon entering from a side door opening, or a second seat structure adapted to be removably positioned on said floor pan providing an occupant outboard seat closely adjacent to said side wall obviating passenger access to the vehicle area rearwardly of said second seat structure from said side door opening, said improved anchorage arrangement comprising a vehicle wall anchorage fixed on said side wall adjacent said floor pan and a floor pan anchorage fixed on one of said floor pan mounting sockets adapted for receiving a latch hook of said second seat structure, whereby said first seat structure is adapted to be removably positioned on said floor pan providing a first seating mode and said second seat structure is adapted to be removably positioned on said floor pan providing a second seating mode;

said floor pan anchorage spaced inboard from said side wall a predetermined dimension whereby it is positioned adjacent a first seat structure mounting socket adapted to be engaged by said first seat structure associated one latch hook;

said belt system restraint portion having its lower free end provided with a snap-action hook adapted, in said first mode, for releasably engaging said floor pan anchorage with said first seat structure coupled to said floor pan, and adapted, in said second mode, for releasably engaging said side wall anchorage with said second seat structure coupled to said floor pan;

whereby in said first mode with said latch plate latched to said first seat structure buckle said shoulder belt segment is deployed diagonally across the upper torso of a first seat structure outboard occupant while said lap belt segment is deployed across the lap of said first seat structure outboard occupant; and whereby in said second mode with said latch plate latched to said second seat structure buckle said shoulder belt segment is deployed diagonally across the upper torso of a second seat structure outboard occupant while said lap belt segment is deployed across the lap of said second seat structure outboard occupant.

2. The motor vehicle occupant restraint belt system as set forth in claim 1, wherein said floor pan anchorage comprising a striker rod transversely mounted on said floor pan so as to bridge a mounting socket, said striker rod formed with a central circular sectioned bar portion and a pair of flattened tongue ends each having parallel side edges, each said tongue end having a mounting hole receiving a bolt therethrough which extends through an associated aligned hole in said floor pan, one of said tongue ends having an undercut recess sized to receive therein a central horizontal generally rectangular base of a one-piece metal floor anchor plate, said anchor plate base having one end formed with a first transversely extending bent flange portion inclined upwardly and outwardly therefrom and formed with an aperture therein, said anchor plate base opposite end formed with a second obliquely extending right-angled bent flange portion projecting vertically upwardly therefrom, said base having a central hole adapted to be aligned with said one tongue end hole upon said anchor plate base second bent flange abutting one of said tongue end side edges, whereby said snap-action hook is adapted to engage said floor pan anchor plate first bent flange aperture providing said floor pan anchorage for said belt system restraint portion with said first seat structure coupled to said floor pan.

3. The motor vehicle occupant restraint belt system as set forth in claim 1, wherein said restraint belt lap segment having a predetermined belt length at its free end received in a coextensive plastic open ended scabbard open at each of it ends, said scabbard having one lower anchored end from which said snap-action hook projects and an upper belt end, said scabbard having an outboard side thereof adjacent its belt end provided with means for removably attaching said scabbard to the vehicle floor carpet, whereby said snap-action hook engaging said floor anchor said scabbard to be pivoted downwardly about said floor anchor so as to overlie the vehicle floor pan carpet enabling said attaching means to releasably fix said scabbard to the vehicle carpet adjacent said vehicle side wall, whereby said scabbard providing a stowed restraint belt mode by maintaining said belt segment in close proximity to said vehicle side wall when said restraint belt system is not in use.

* * * * *